United States Patent
Manabe et al.

(10) Patent No.: US 8,159,850 B2
(45) Date of Patent: *Apr. 17, 2012

(54) CONVERTER CONTROL DEVICE

(75) Inventors: Kota Manabe, Toyota (JP); Takahiko Hasegawa, Toyota (JP); Takeshi Maenaka, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 423 days.

This patent is subject to a terminal disclaimer.

(21) Appl. No.: 12/443,596

(22) PCT Filed: Oct. 1, 2007

(86) PCT No.: PCT/JP2007/069530
§ 371 (c)(1),
(2), (4) Date: Mar. 30, 2009

(87) PCT Pub. No.: WO2008/047617
PCT Pub. Date: Apr. 24, 2008

(65) Prior Publication Data
US 2009/0316453 A1    Dec. 24, 2009

(30) Foreign Application Priority Data

Oct. 20, 2006  (JP) ................. 2006-286090

(51) Int. Cl.
*H02M 5/00*       (2006.01)

(52) U.S. Cl. ........... 363/149; 363/65; 323/214; 323/239

(58) Field of Classification Search ............... 363/4, 65, 363/148, 149, 34–41, 95; 323/206, 207, 323/214, 219, 239, 240, 246, 346
See application file for complete search history.

(56) References Cited

U.S. PATENT DOCUMENTS

| | | | | |
|---|---|---|---|---|
| 5,559,685 A | * | 9/1996 | Lauw et al. | 363/37 |
| 5,717,584 A | * | 2/1998 | Rajashekara et al. | 363/98 |
| 6,208,497 B1 | * | 3/2001 | Seale et al. | 361/160 |

FOREIGN PATENT DOCUMENTS

| | | |
|---|---|---|
| DE | 102 05 069 A1 | 9/2002 |
| JP | 9-74769 A | 3/1997 |
| JP | 2003-111384 A | 4/2003 |
| JP | 2003-235252 A | 8/2003 |
| JP | 2004-357388 A | 12/2004 |
| JP | 2005-027391 A | 1/2005 |
| JP | 2005-94874 A | 4/2005 |
| JP | 2006-033934 A | 2/2006 |
| JP | 2006-311776 A | 11/2006 |

* cited by examiner

*Primary Examiner* — Rajnikant Patel
(74) *Attorney, Agent, or Firm* — Kenyon & Kenyon LLP

(57) ABSTRACT

A converter control device includes a converter device formed by three converter circuits connected together in parallel between a secondary battery as a first power source and a fuel cell as a second power source. A control unit includes: a PID control module for controlling the converter device by PID control and executing a desired voltage conversion; a drive phase quantity changing module for changing the number of drive phases of the converter device in accordance with the passing power of the converter device; and an integration term correction function switching module which switches the PID control integration term correction function when changing the number of drive phases.

8 Claims, 6 Drawing Sheets

| NUMBER OF DRIVE PHASES | INTEGRATION TERM CORRECTION FUNCTION |
|---|---|
| THREE PHASES | CORRECTION FUNCTION (93) |
| TWO PHASES | CORRECTION FUNCTION (92) |
| SINGLE PHASE | CORRECTION FUNCTION (91) |

CONVERTER CONTROL DEVICE

This is a 371 national phase application of PCT/JP2007/069530 filed 1 Oct. 2007, claiming priority to Japanese Patent Application No. JP 2006-286090 filed 20 Oct. 2006, the contents of which are incorporated herein by reference.

BACKGROUND OF THE INVENTION

The present invention generally relates to a converter control device, and particularly to a converter control device including an arrangement in which a plurality of converters are connected together in parallel, the converters being connected between a first power source and a second power source, and each having a plurality of switching elements and reactors to perform a voltage conversion in both directions, the converter control device changing the number of converter phases to be driven according to converter passing power.

In power supply systems using fuel cells, a voltage converter raising or dropping the voltage of an output from a secondary battery is provided and connected to an output terminal of the fuel cells to supply power. The purpose of the provision of the voltage converter is to deal with a fluctuation in load exceeding the power generation capacity of the fuel cells, to improve system efficiency, and to recover regenerative power when a regenerative motor is utilized as a load. Here, the voltage converter has a DC voltage converting function and is sometimes referred to as a DC/DC converter. For example, the voltage converter is composed of switching elements and a reactor. For example, to reduce the rating capacity of the switching elements, a plurality of converters are connected together in parallel.

For instance, Japanese Patent Laid-Open Publication No. 2006-33934 discloses that in order to deal with a rapid change in load amount exceeding the charging capability of a fuel cells, a voltage converter operating in a plurality of phases is connected between the fuel cells and a battery so that the number of phases of the voltage converter and duty ratio, can be varied based on a predicted variation in load amount. In Japanese Patent Laid-Open Publication No. 2006-33934, it is described as follows. In the voltage converter including the plurality of phases, generally, loss power lost in the converter varies depending on the value of passing power corresponding to the quantity of I/O conversion energy or the quantity of operational work. With high passing power, the loss is lower for a three-phase operation than for the single-phase operation. With low passing power, the loss is lower for the single-phase operation than for the three-phase operation. The reason for the variation in loss power is described as follows in Japanese Patent Laid-Open Publication No. 2006-33934. Losses to the three-phase bridge converter include a reactor copper loss caused by coils of the reactors, a module loss caused by operation of the switching elements, and a reactor iron loss caused by a magnetic substance in the reactors. The reactor copper loss and the module loss increase consistently with increase of the passing power and are heavier for the single-phase operation than for the three-phase operation. The reactor iron loss is almost independent of the passing power and is heavier for the three-phase operation than for the single-phase operation. Japanese Patent Laid-Open Publication No. 2006-33934 further describes the following. The single-phase operation is performed in a region of low passing power, whereas the three-phase operation is performed in a region of high passing power. When the three-phase operation is changed to the single-phase operation, the effective value of alternating current fluctuates in connection with a voltage conversion. Thus, in PID control, the voltage, current, and power fluctuate temporarily. Accordingly, the shortage of the power is compensated for by increasing the duty ratio.

Furthermore, Japanese Patent Laid-Open Publication No. 2003-235252 discloses a method of maximizing a conversion efficiency when a plurality of DC/DC converters are provided between an inverter and a battery. According to Japanese Patent Laid-Open Publication No. 2003-235252, the method uses master-slave DC/DC converters including one master DC/DC converter. The number of DC/DC converters to be operated, including the master DC/DC converter, is set with input power to or output power from the master DC/DC converter defined as reference power. Then, the output voltage from the master-slave DC/DC converters is increased and reduced within not exceeding the maximum allowable charging voltage and current of the battery. Then, the conversion efficiency is calculated, and the output voltage is adjusted to a value almost corresponding to the maximum conversion efficiency. Japanese Patent Laid-Open Publication No. 2003-235252 also describes the following. The conversion efficiency of the DC/DC converters is related to a switching loss on the primary side and a loss on the secondary side which is caused by a forward voltage drop in a rectifying diode. With high input power, the primary-side loss increases. With low input power, the primary-side loss decreases, and the secondary-side loss becomes dominant.

Japanese Patent Laid-Open Publication No. 2003-111384 discloses a method of, when the voltage of power of a main power source is converted by a plurality of DC/DC converters connected in parallel and the converted voltage is supplied to an auxiliary battery, preventing a possible increase in the use frequency of a particular DC/DC converter. Japanese Patent Laid-Open Publication No. 2003-111384 describes the following. The order in which the plurality of DC/DC converters are started is varied according to a predetermined specified order. The predetermined specified order is set according to the contents of measured voltage-current characteristics of the DC/DC converters.

As described above, in the configuration using the plurality of converters connected in parallel, the number of converter phases to be driven is controllably changed depending on the passing power through the converters. Furthermore, switching duty ratio is controlled in order to perform a voltage conversion so as to achieve a desired voltage rise or drop. In this case, for example, feedback control is used which feeds back the measured value of duty ratio of an actual operation with respect to a instruction value of the duty ratio to inhibit a deviation between the measured value and the instruction value of the duty ratio. For instance, a PID (Proportional-Integral-Derivative) control system can be used for the feedback control of the duty ratio.

When the number of converter phases used for the voltage conversion is changed, the state of a relevant feedback loop may change. As a result, the feedback control is not always optimum unless some appropriate measures are taken. For example, in the case where the number of converter phases is changed when the converter passing power exhibits a certain value, a passing current per converter circuit changes, resulting in a corresponding change in a correction value of an integration term for PID control. Thus, since a change in the number of converter phases may change the state of the feedback loop, the feedback control is not always optimum unless some appropriate measures are taken.

SUMMARY OF THE INVENTION

The object of the present invention is to provide a converter control device which, when performing the voltage conversion by changing the number of drive phases of the converter according to the load, enables PID control appropriate to the changed number of drive phases.

A converter control device according to the present invention includes an arrangement in which a plurality of converters are connected together in parallel, the converters being connected between a first power source and a second power source and each having a plurality of switching elements and a reactor to convert a voltage in both directions, and changes the number of converter phases to be driven, according to converter passing power. The converter control device comprises a control unit feeding back a measured value of duty ratio of an actual operation with respect to an instruction value of the duty ratio provided to the plurality of switching elements for the voltage conversion, to inhibit a deviation between the measured value and the instruction value of the duty ratio by PID control, storage section which, in order to corrects a integration term for the PID control, predetermines and stores a correction function for the integration term for each number of the drive phase, the correction function corresponding to a relationship between converter passing power and the correction value for the integration term, and a switching section of the correction function for the integration term which, when the number of drive phases is changed according to the converter passing power, switches to the correction function for the integration term corresponding to the changed number of drive phases.

Furthermore, in the converter control device according to the present invention, the storage section preferably stores the integral correction value for each of the states into which the state of the converter passing power is distinguished and which include a positive state that the power passes from a first power source side to a second power source side, a negative state that the power passes from the second power source side to the first power source side, and a zero cross state that is intermediate between the positive state and the negative state.

Furthermore, in the converter control device according to the present invention, the storage section preferably stores the integral correction value for each of the states of the converter passing power distinguished from one another based on comparison between predefined thresholds and both a maximum value and a minimum value for a converter passing current waveform varying depending on a control cycle of the duty ratio.

In the above-described configuration, the converter control device predetermines and stores the relationship between the correction function for the integration term in the PID control for the voltage conversion of the converter and the number of drive phases of the converters. When changing the number of drive phases of the converter, the converter control device switches the correction function for the integration term in the PID control to the correction function for the integration term corresponding to the changed number of drive phases. Thus, when the number of converter drive phases is changed according to the load, the PID control suitable for the number of drive phases can be performed.

Furthermore, the storage section stores the integral correction value for each of the states into which the state of the converter passing power is distinguished and which include the positive state that the power passes from the first power source side to the second power source side, the negative state that the power passes from the second power source side to the first power source side, and the zero cross state that is intermediate between the positive state and the negative state. Thus, compared to storage of the correction functions for the integration term in function form as such, the above-described storage section allows a reduction in storage capacity, enabling the PID control suitable for the number of drive phases of the converters.

Alternatively, the storage section stores the integral correction value for each of the states of the converter passing power distinguished from one another based on comparison between predefined thresholds and both the maximum value and minimum value for current waveform passing through the converter which varies depending on a control cycle of the duty ratio. Thus, the integration correction values can be stored so as to be clearly distinguished from one another, enabling the PID control suitable for the number of drive phases of converters.

DETAILED DESCRIPTION OF THE PREFERRED EMBODIMENTS

An embodiment according to the present invention will be described below with reference to the drawings. A vehicle-mounted power supply system connected to a vehicle driving motor/generator will be described as a power supply system to which a converter control device is applied. However, the present invention is applicable to any power supply system other than that for vehicle, for example, the power supply system fixed in a building. Furthermore, a system in which a nickel hydrogen secondary battery is a first power source and in which a solid polymer membrane fuel cells are a second power source will be described below as the power supply system to which the converter control device is applied. However, the present invention is applicable to any other type of power source. For example, the secondary battery may be of a lithium ion type, and the fuel cells may be of a type other than a solid electrolyte one. Furthermore, a configuration in which three converter circuits are connected together in parallel will be described below as the converter device. However, the number of the plurality of converter circuits making up the converter device may be other than two, or more than four. Additionally, in the description below, driving duty ratio is controlled by PID control to perform a desired voltage conversion. However, alternatively, PI (Proportional-Integral) control may be used to perform the voltage conversion.

Figure 1:
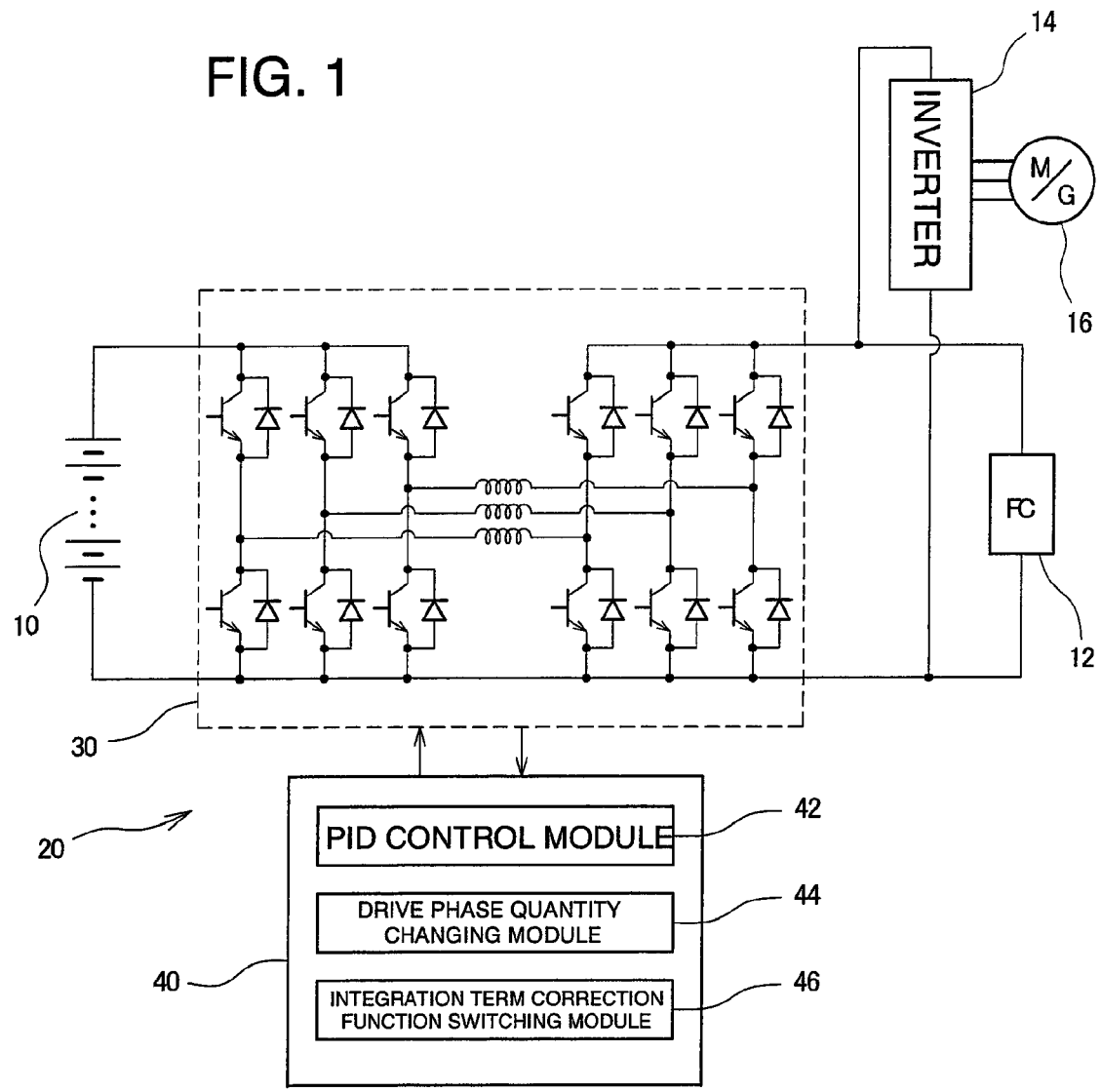
FIG. 1 is a view showing a configuration of a vehicle power supply system including a converter control device according to an embodiment of the present invention.

FIG. 1 is a view showing a configuration of a vehicle power supply system including a converter control device 20. FIG. 1 shows a secondary battery 10 as a first power source, fuel cells 12 as a second power source, and a converter device 30 provided between the secondary battery 10 and the fuel cells 12, as a power supply system connected to the vehicle motor/generator 16. Operation of the converter device 30 is controlled by a control unit 40. Thus, the converter device 30 and the control unit 40 make up a converter control device 20.

The power supply system is connected to a motor/generator 16 via an inverter 14. The inverter 14 converts DC power from the power supply system into three-phase AC power. The inverter 14 supplies the three-phase AC power to the motor/generator 16, which thus functions as a driving source for a vehicle. Furthermore, during the vehicle braking, the inverter 14 also has a function of converting regenerative energy recovered by the motor/generator 16 into DC power and supplying the DC power to the power supply system as charging power.

The secondary battery 10 is a chargeable and dischargeable high-voltage power supply pack composed of a plurality of electric cells such as nickel hydrogen electric cells or lithium ion electric cells, and providing a desired high voltage. The secondary battery 10 can supply a high voltage of, for example, about 200 to 400 V to between a positive pole bus and a negative pole bus.

The fuel cells 12 is a kind of combination cell composed of a combination of a plurality of fuel cell units so as to allow power generation power of a desired high voltage to be extracted. This kind of combination cells is called a fuel cell stack. Here, each of the fuel cells has a function of supplying hydrogen to an anode side as a fuel gas and supplying air to a cathode side as an oxidation gas to cause a cell chemical reaction through an electrolyte membrane that is a solid polymer membrane, to extracting required power. The fuel cells 12 can supply a high voltage of, for example, about 200 to 400 V to between the positive pole bus and the negative pole bus.

The converter device 30 includes a plurality of converter circuits. Each of the converter circuits is a DC voltage converting circuit having a function of converting the voltage between the secondary battery 10, which is the first power source, and the fuel cells 12, which is the second power source. The plurality of converter circuits are used in order to deal with a heavy load without the need to increase the rating capacity of electronic elements making up the converter circuit. In the example in FIG. 1, the three converter circuits are connected together in parallel to make up one converter device 30. For instance, the phases of the three converter circuits are displaced from one another by 120° to perform what is called three-phase driving. This enables a reduction in the load on each of the converter circuits and also reduces output current ripples to enable accurate voltage control.

The converter device 30 has a function of, when for example, the power generation capability of the fuel cells 12 cannot deal with a variation in the load on the motor/generator 16, subjecting the power of the secondary battery 10 to a voltage conversion and supplying the converted power to the fuel cells 12 side to allow the whole power supply system to deal with the variation in the load on the motor/generator 16.

The converter circuit making up the converter device 30 is composed of a primary side switching circuit provided on the first power source side and including a plurality of switching elements and a plurality of rectifiers, a secondary side switching circuit provided on the second power source side and including a plurality of switching elements and a plurality of rectifiers, and a reactor provided between the primary side switching circuit and the secondary side switching circuit.

The primary side switching circuit can be composed of two switching elements connected in series between the positive pole bus and negative pole bus of a high-voltage line and two rectifiers connected in parallel with the respective switching elements. The switching elements and the like connected to the positive pole bus side are sometimes referred to as an upper arm. The switching elements and the like connected to the negative pole bus side are sometimes referred to as a lower arm. The secondary side switching circuit may have a similar configuration. The switching elements may be high voltage and high power switching elements, for example, IGBTs (Insulated Gate Bipolar Transistors). The rectifiers may be high-power diodes.

The reactors are elements having a function of allowing magnetic energy to be stored or emitted, and may be air-core coils or coils with an iron core. Each of the reactors is provided to connect a junction between the two switching elements in the primary side switching circuit and a junction between the two switching elements in the secondary side switching circuit.

In the converter circuit, on and off control is performed in appropriate timings on each of the set of the upper and lower arms making up the primary side switching circuit and the set of the upper and lower arms making up the secondary side switching circuit. Thus, power on the first power source side can be temporarily stored as magnetic energy in the reactor. The stored magnetic energy in the reactor can be converted into electric energy again, which can then be supplied to the secondary power source side as power. By changing an on/off switching ratio, that is duty ratio, the voltage on the primary power source side can be increased, and the increased voltage can be supplied to the secondary power source side. Alternatively, the power on the primary power source side can be reduced, and the reduced power can be supplied to the second power source side. Similarly, the power on the second power source side can be subjected to a voltage conversion, and the resulting power can be supplied to the first power source side.

The control unit 40 makes up the converter control device 20 together with the converter device 30. The control unit 40 has a function of controlling the voltage converting operation performed by the converter device 30, according to the load. The control unit 40 can be composed of a vehicle mounted computer. The control unit 40 may be composed of an independent computer. However, another vehicle mounted computer may be provided with the function of the control unit 40. For example, when a hybrid CPU or the like is provided in the hybrid vehicle, the hybrid CPU can be provided with the function of the control unit 40.

The control unit 40 includes a PID control module 42 that controls the converter device 30 by the PID control so that the converter device 30 performs a desired voltage conversion, a drive phase quantity changing module 44 that changes the number of drive phases of the converter device 30 according to the passing power of the converter device 30, and an integration term correction function switching module 46 which, when the number of drive phases is changed, switches a correction function on an integration term for the PID control.

The correction function on the integration term will be described below in detail. These functions can be implemented by software, and specifically by executing a corresponding converter control program. Alternatively, some of the functions may be implemented by hardware.

The PID control module 42 in the control unit 40 has a function of performing a desired voltage conversion between the secondary battery 10 and the fuel cells 12 by controlling on and off timing, an on/off duty ratio, and the like, with the PID control system, for each of the switching elements making up the converter device 30 to perform a desired voltage conversion between the secondary battery 10 and the fuel cells 12. For example, the duty ratio is increased to raise the voltage of the secondary battery 10 so that the raised voltage can be supplied to the fuel cells 12 side. The duty ratio is reduced to drop the voltage of the secondary battery 10 so that the dropped voltage can be supplied to the fuel cells 12 side. Then, the PID control module 42 controllably feeds back the duty ratio of an actual operation with respect to an instructed duty ratio and uses the PID control system to inhibit a deviation between the instructed duty ratio and the duty ratio of the actual operation.

Figure 2:
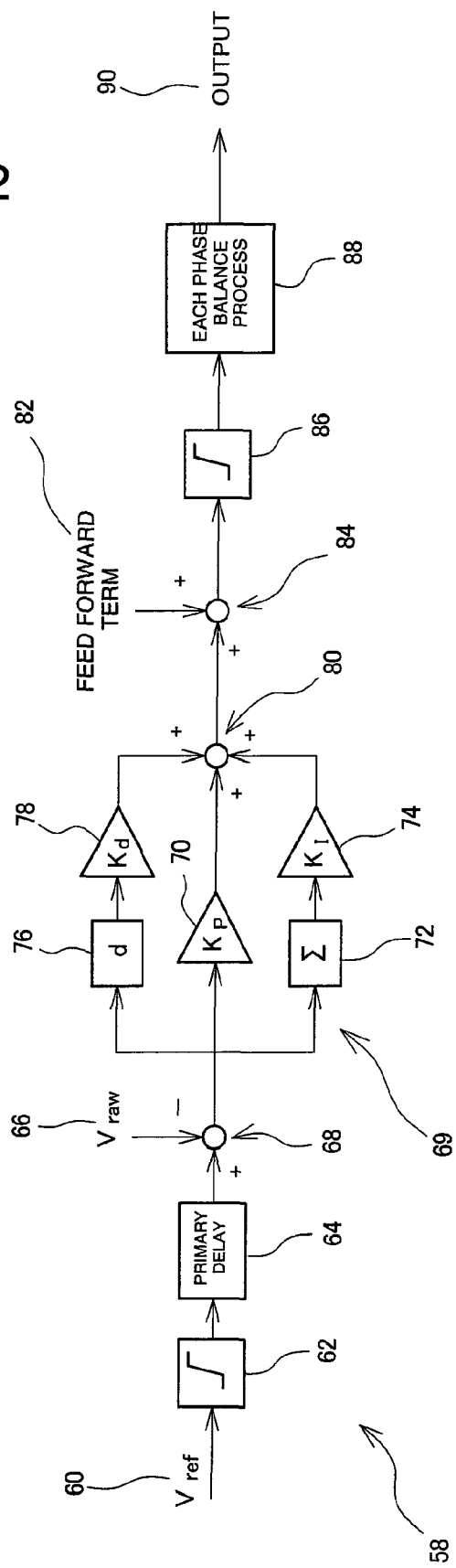
FIG. 2 is a block diagram of a PID control circuit in the converter control device according to the embodiment of the present invention.

FIG. 2 is a block diagram of a PID control circuit 58 that performs voltage conversion control using the PID control system In the description below, the components are denoted by the reference numerals described for FIG. 1. In FIG. 2, the instruction value of the duty ratio is denoted by Vref (60), and the duty ratio of the actual operation is denoted by Vraw (66). An output 90 to the converter device 30 is created based on a feedback of the Vraw (66) and a feed forward for which an output voltage from the secondary battery 10 is taken into account. The block diagram is based on the voltage as indicated by the Vref (60) and Vraw (66). However, this is because the configuration of the control circuit can be conveniently discussed based on the voltage. The actual duty ratio is a time ratio or a simple digital value. Furthermore, FIG. 2 is a block diagram of one of the three converter circuits making up the converter device 30. The contents of FIG. 2 also apply to the other converter circuits.

In FIG. 2, Vref (60) denotes an on/off instruction value for the switching elements making up the converter device 30, specifically the instruction value of the duty ratio. The duty ratio refers to the ratio of on time to the sum of the on time and off time. For example, provided that on/off control is repeated every 100 μsec, when the on time is 40 μsec and the off time is 60 μsec, the duty ratio is 40/(40+60)=0.4. Vref (60) is obtained by converting the duty ratio=0.4 into data for an appropriate voltage value. Based on the conditions of the fuel cells 12 and the secondary battery 10, the instruction value Vref (60) of the duty ratio is determined according to the amount by which the voltage is increased or reduced. For example, the duty ratio corresponding to the voltage rise or drop for voltage conversion can be determined using, as inputs, a required load amount, the current power generation capability of the fuel cells 12, the charging condition of the secondary battery 10, and the like and also using a predefined relational expression, a map, or the like.

A limiter 62 is a limiting circuit that sets an upper limit and a lower limit for the Vref (60) so as to prevent the Vref (60) from becoming excessively large. A primary delay element 64 is a filter having a function of limiting a change rate for an output from the limiter 62 to adjust a change speed such that the converter can follow the change speed.

A subtractor 68 has a function of subtracting the value of the Vraw (66) from the output from the primary delay element 64. Vraw (66) is the duty ratio for the actual operation of the converter device 30. A value obtained from an actual on/off waveform or the like from each of the switching elements making up the converter device 30 can be used as Vraw (66). With the actual duty ratio fed back with respect to the instruction value of the duty ratio, the function of the subtractor 68 allows the deviation between the actual duty ratio and the instruction value of the duty ratio to be output.

The deviation of the duty ratio output by the subtractor 68 is input to a PID arithmetic-operation unit 69. The PID arithmetic-operation unit 69 includes a proportional operation element 70 having a proportional control gain $K_P$ required to perform proportional control for inhibiting the possible deviation, an integrator 72 and an integral operation element 74 having an integral control gain $K_I$ which use an integration process to inhibit elements that cannot be inhibited by the proportional control, a differentiator 76 and a differential operation element 78 having a differential control gain $K_d$ that use a differentiation process to inhibit the elements that cannot be inhibited by the proportional control.

The PID arithmetic-operation unit 69 thus includes the proportional control gain $K_P$, the integral control gain $K_I$, and the differential control gain $K_d$. These control gains can be experimentally determined based on the responsiveness and controllability of the actual converter device 30 obtained by performing the PID control.

The results of the proportional control, integral control, and differential control are added together by an adder 80. Thus, on/off data corrected so as to inhibit the possible deviation using the PID control system is output to the adder 80.

A feed forward term 82 is a feed forward amount corresponding to a value determined from the instruction value Vref and output voltage from the secondary battery 10 using a predetermined expression; the feed forward amount is reflected in the duty ratio. An adder 84 has a function of adding the feed forward term to an output from the adder 80 after the PID control. A limiter 86 is a limiting circuit that sets an upper limit and a lower limit for the output from the adder 84 so as to prevent the output from becoming excessively large. Each phase balance process 88 has a function of, based on results from the converter circuit for the present drive phase and the converter circuits for the other drive phases, maintaining a duty balance between the three drive phases. The result of each phase balance process 88 is output to the converter device 30 as an on/off signal for the switching elements in the converter circuits making up the converter device 30 (see the output 90).

The PID control circuit 58, having the above-described contents of the block diagram, can be implemented by an analog circuit or a digital circuit. Alternatively, the PID control circuit 58 may be composed partly of a digital circuit and partly of an analog circuit.

Figure 3:
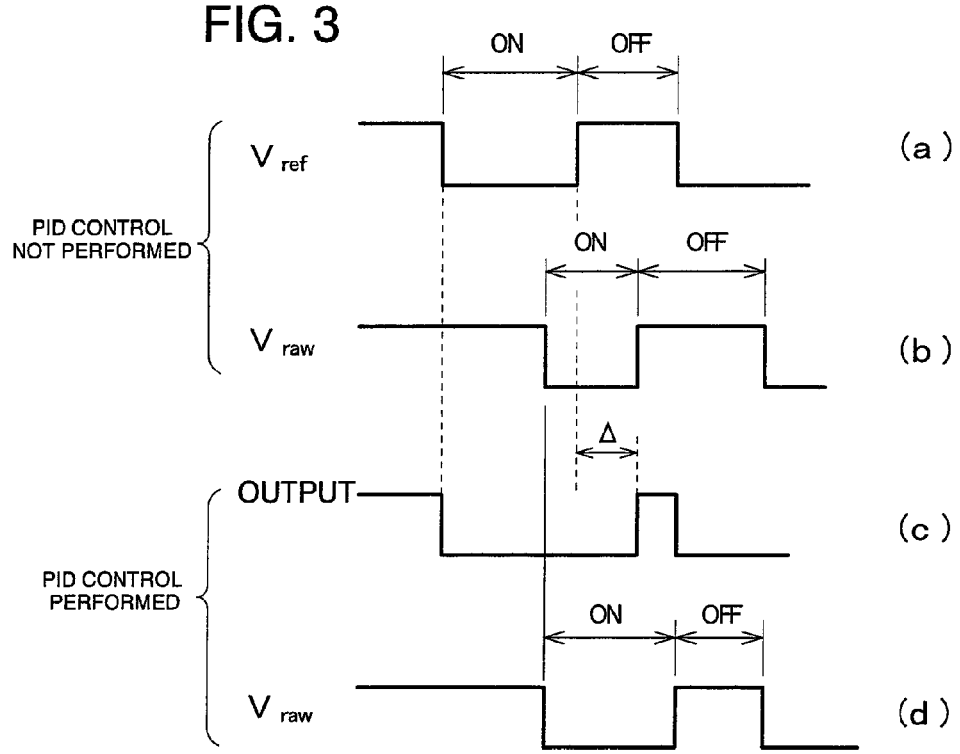
FIG. 3 is a time chart illustrating operations of a PID control system in the converter control device according to the embodiment of the present invention.

FIG. 3 is time charts illustrating operations of the PID control. In FIG. 3, the axis of abscissa indicates time, and the axis of ordinate indicates voltage. The origin of the time axis is common for each chart. The charts (a) and (b) are views showing a relationship between Vref and Vraw observed if the PID control is not performed. That is, when Vref is given as an instruction in the on/off signal for each of the switching elements in the converter device 30, Vref becomes Vraw in actual operations of the converter device 30. Namely, even though Vref is instructed, delay occurs to change the duty ratio as such. Thus, a deviation occurs between the duty ratio instructed by Vref and Vraw which is the duty ratio in the actual operation of the converter device 30. For example, even though in the chart (a), the duty ratio instructed for Vref is 0.6, the duty ratio for actual Vraw, shown in the chart (b), may be 0.4.

This is because many delay elements and the like are present between the control circuit, which calculates and outputs Vref, and the switching elements in the converter device 30. For instance, an output from a Vref calculating circuit is supplied via a photo coupler to the PID control circuit 58, described for FIG. 2. The output (90) from the PID control circuit 58 is supplied to each of the switching elements in the converter device 30 via the photo coupler. Thus, delay, distortion of waveforms, and the like may occur in association with transmission and reception of signals at the photo coupler. Another cause is setting of a delay provided so as to avoid allowing the upper and lower arms, making up the converter device 30, to be simultaneously turned on. A delay also occurs in the converter device 30.

The PID control has a function of inhibiting a deviation that is a difference between the duty ratio instructed by the Vref and the duty ratio by the Vraw in actual operation of the converter device 30. The chart (c) of FIG. 3 shows an output provided when the PID control is performed, that is, the on/off signal provided to the converter device. The signal corresponds to the output 90 described for FIG. 2. The on time of this signal waveform is corrected so as to be longer than that of Vref, which is the original duty ratio instruction, by $\Delta$. The correction amount $\Delta$ is a correction term for the PID control and is such that when the above-described output is input to the converter device 30, the duty ratio of the actual operation of the switching elements making up the converter device 30 is the same as the duty ratio instructed by the original Vref. The chart (d) of FIG. 3 shows the operation duty ratio of the switching element with respect to the corrected output, that is, Vraw. The duty ratio for Vraw is almost the same as the duty ratio instructed for the original Vref, that is, 0.6.

In this manner, the duty ratio of the actual operation can be fed back with respect to the instructed duty ratio, and the PID control system can then be used to inhibit the possible deviation between the instructed duty ratio and the duty ratio of the actual operation.

Referring back to FIG. 1, the drive phase quantity changing module 44 of the control unit 40 has a function of changing, according to power passing through the converter device 30, the number of the three converter circuits making up the converter device 30 which are to be driven. The power passing though the converter device 30 can be arithmetically determined using, for example, a map. For instance, output power provided to the converter device 30 by the secondary battery 10 is determined from the measured values of the output voltage and the output current from the secondary battery 10. A load loss is subtracted from the output power, and the result is multiplied by the conversion efficiency of the converter device 30. This arithmetic operation enables the passing power of the converter device 30 to be determined. Furthermore, the passing power of the converter device 30 passes through the reactors making up the converter device 30. Thus, a proper current detecting sensor may be provided for the reactors to detect a current flowing through each of the reactors so that based on the detection data, the passing power of the converter device 30 can be determined.

Figure 4:
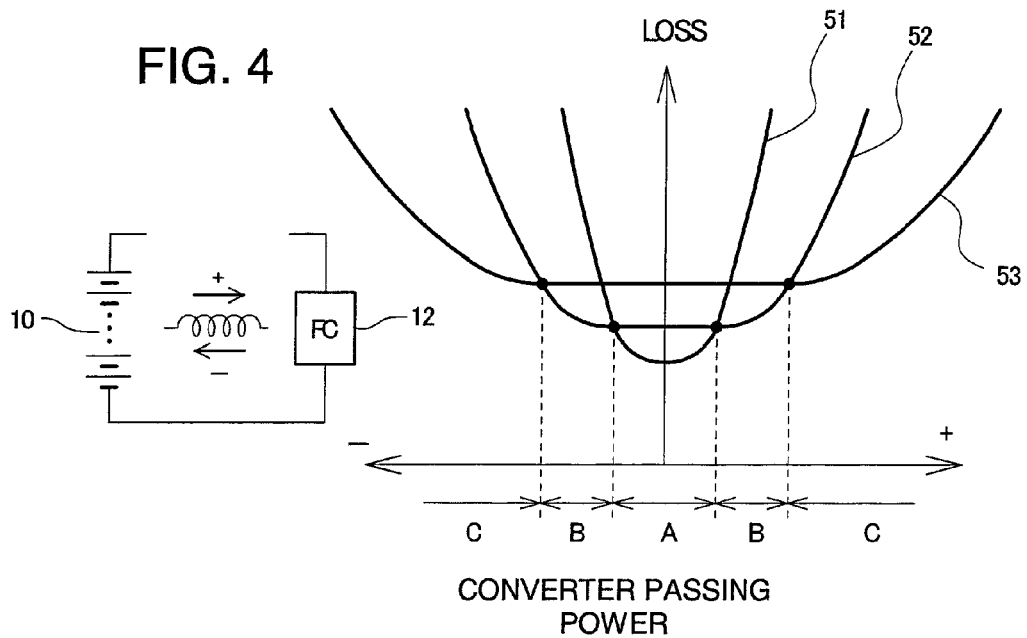
FIG. 4 is a view schematically illustrating a relationship between power passing through a converter device and a loss to the converter device, the relationship being expressed using the number of drive phases of the converter device as a parameter, according to the embodiment of the present invention.

FIG. 4 schematically illustrates a relationship between the power passing through the converter device 30 and a loss to the converter device 30 using the number of drive phases of the converter device 30 as a parameter. In FIG. 4, the axis of abscissa indicates the converter passing power, and the axis of ordinate indicates the loss to the converter device 30. The converter passing power is denoted by a symbol "+" when current flows from the secondary battery side to the fuel cells side and by a symbol "−" when current flows from the fuel cells side to the secondary battery side. FIG. 4 shows a loss characteristic curve 51 for single-phase driving in which only one converter circuit in the converter device 30 is driven, a loss characteristic curve 52 for two-phase driving in which two converter circuits in the converter device 30 are driven, and a loss characteristic curve 53 for three-phase driving in which three converter circuits in the converter device 30 are driven.

As described above for Japanese Patent Laid-Open Publication No. 2006-33934, losses in a converter device using switching elements and reactors include a reactor copper loss caused by the coils of the reactors, a module loss caused by the operation of the switching elements, and a reactor iron loss caused by a magnetic substance in the reactors. The reactor copper loss and the module loss increase consistently with passing power and are heavier for the single-phase operation than for the three-phase operation. The reactor iron loss is almost independent of the passing power and is heavier for the three-phase operation than for the single-phase operation. FIG. 4 shows this. That is, when the passing power is low and falls within a range "A", the loss characteristic curve 51 for the single-phase driving exhibits the slightest loss. When the passing power increases and falls within a range "B", the loss characteristic curve 52 for the two-phase driving exhibits the slightest loss. When the passing power further increases and falls within a range "C", the loss characteristic curve 53 for the three-phase driving exhibits the slightest loss.

Based on the results shown in FIG. 4, the drive phase quantity changing module 44 of the control unit 40 gives instructions according to the passing power of the converter device 30; the drive phase quantity changing module 44 instructs the single-phase driving to be performed when the passing power falls within the range "A", instructs the two-phase driving to be performed when the passing power falls within the range "B", and instructs the three-phase driving to be performed when the passing power falls within the range C.

Here, an intersecting point between the loss characteristic curve 51 for the single-phase driving and the loss characteristic curve 52 for the two-phase driving corresponds to a branch point between the range "A" and the range "B". An intersecting point between the loss characteristic curve 52 for the two-phase driving and the loss characteristic curve 53 for the three-phase driving corresponds to a branch point between the range "B" and the range "C". The loss characteristic curves can be predetermined. Thus, the following values can be preset: the value of the passing power observed when the single-phase driving is changed to the two-phase driving corresponding to the branch point between the range "A" and the range "B", and the value of the passing power observed when the two-phase driving is changed to the three-phase driving corresponding to the branch point between the range "B" and the range "C". When the former absolute value is defined as a single-phase to two-phase change threshold $P_{12}$, and the latter absolute value is defined as a two-phase to three-phase change threshold $P_{23}$, the absolute value P of the passing power of the converter device 30 is determined so that the single-phase driving is specified for $P \leqq P_{12}$, the two-phase driving is specified for $P_{12} < P < P_{23}$, and the three-phase driving is specified for $P \geqq P_{23}$.

Referring back to FIG. 1, the integration term correction function switching module 46 of the control unit 40 has a function of, when the number of drive phases is changed, switching a correction function for an integration term in the PID control. The correction function for the integration term expresses a relationship between the converter passing power and a correction value for the integration term in function form. Here, the correction value for the integration term is employed by the integral control in the PID control in order to inhibit the deviation. The correction value for integration term corresponds to a correction amount calculated by the integral operation element 74 in FIG. 2.

The correction function for the integration term can be experimentally determined. For example, for the actual three-phase driving, the converter passing power is changed to perform the PID control to inhibit the possible deviation between the instruction value of the duty ratio and the actual duty ratio. Under the control, the correction value for the integration term is determined. Thus, the correction function for the integration term in the three-phase driving can be obtained.

Figures 5, 6:
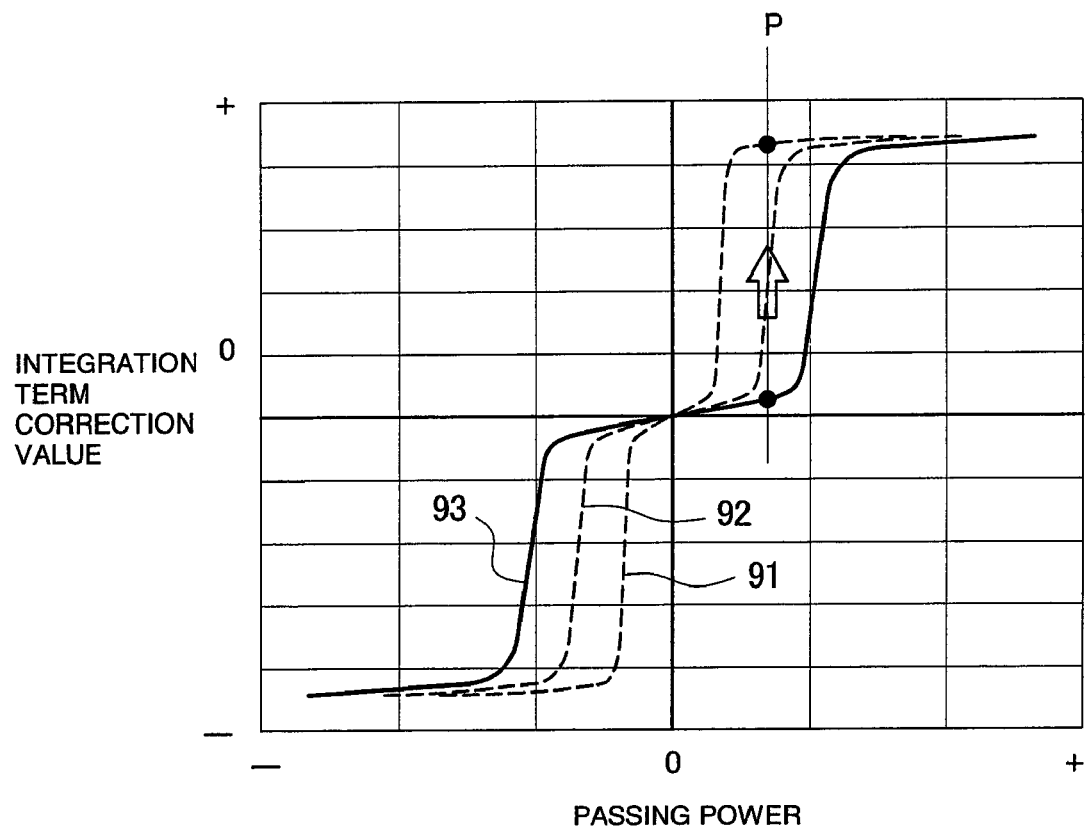
FIG. 5 is a view showing examples of a correction function of an integration term according to the embodiment of the present invention.
FIG. 6 is a view showing a correspondence relationship between the number of drive phases and the correction function of the integration term, in a list form according to the embodiment of the present invention.

FIG. 5 is a view showing an example of the correction function for the integration term. In FIG. 5, the axis of abscissa indicates the passing power of the converter device 30. The axis of ordinate indicates the correction value for the integration term in the PID control. The symbols on the axis of abscissa are the same as those described for FIG. 4. The symbol "+" denotes the flow of current from the secondary battery side to the fuel cell side. The symbol "−" denotes the flow of current from the fuel cell side to the secondary battery side. FIG. 5 shows the correction function for the integration term corresponding to the number of drive phases of the converter device 30. That is, FIG. 5 shows a correction function 91 for the integration term in the single-phase driving, a correction function 92 for the integration term in the two-phase driving, and a correction function 93 for the integration term in the three-phase driving.

The passing power of the converter device 30 and the passing power of one of the converter circuits making up the converter device 30 vary depending on the number of drive phases. For example, when the passing power of the converter device 30 is defined as "P", the passing power of one converter circuit is P/3 for the three-phase driving and "P" for the single-phase driving. That is, when the three-phase driving is changed to the single-phase driving, the power passing through one converter circuit is increased three-fold. Since the integration term correction for the PID control is performed according to the passing power of one converter circuit, a change from the three-phase driving to the single-phase driving requires a change to the correction value for the integration term corresponding to the triple passing power based on the correction value for the integration term in the three-phase driving. That is, in the case where the axis of abscissa indicates the passing power of the converter device 30, the correction function for the integration term in the single-phase driving corresponds to the axis of abscissa for the correction function for the integration term in the three-phase driving reduced to one-third. Thus, the correction functions 91 and 92 for the integration term in the single-phase driving and the two-phase driving in FIG. 5 are obtained by reducing the axis of abscissa for the correction function 93 in the three-phase driving based on the corresponding difference in the magnitude of the passing power.

FIG. 6 is a view showing a correspondence relationship between the number of drive phases and the correction function for the integration term. Thus, a change in the number of drive phases changes the correction function for the integration term to be applied. The correction function for the integration term to be applied for each drive phase quantity can be obtained as follows. For example, the correction function for the integration term in the three-phase driving is experimentally determined. Based on this, the axis of abscissa is reduced as described above. Thus, the correction functions for the integration term in the single- and two-phase driving can be obtained. Preferably, each of the thus predetermined correction functions for the integration term is stored in an appropriate storage device using the number of drive phases as a search key, so as to be read and utilized when the number of drive phases is changed. An appropriate semiconductor memory or the like can be used as the storage device. For example, a memory provided in the control unit 40 can be used.

With the correction function for the integration term corresponding to the number of drive phases known, when the number of drive phases is changed, the correction function or correction value for the integration term can be switched as follows. For example, in FIG. 5, the converter passing power is defined as "P", and under this condition, the number of drive phases is assumed to be changed from the three-phase driving to the single-phase driving. Then, the correction value for the integration term is switched from the value for the converter passing power "P" of the correction function 93 to the value for the converter passing power "P" of the correction function 91.

Specifically, the following process procedure is preferably executed. That is, when the converter device 30 changes the number of drive phases, first, the number of phases driven in the converter device 30 is determined (phase quantity determining step). Then the correction function for the integration term is switched to one corresponding to the number of drive phases determined in the phase quantity determining step. To achieve this, for example, the number of drive phases is used as a search key to read and acquire the correction function for the integration term corresponding to the number of drive phases from the storage device in which the predetermined correction functions integration term are stored (step for acquiring a corresponding correction function for integration term). Then, the correction function for integration term used in the current number of drive phases is switched to the correction function for integration term is switched to the acquired correction function (step for switching the correction function for integration term). The PID control is then performed (PID control step).

Figure 7:
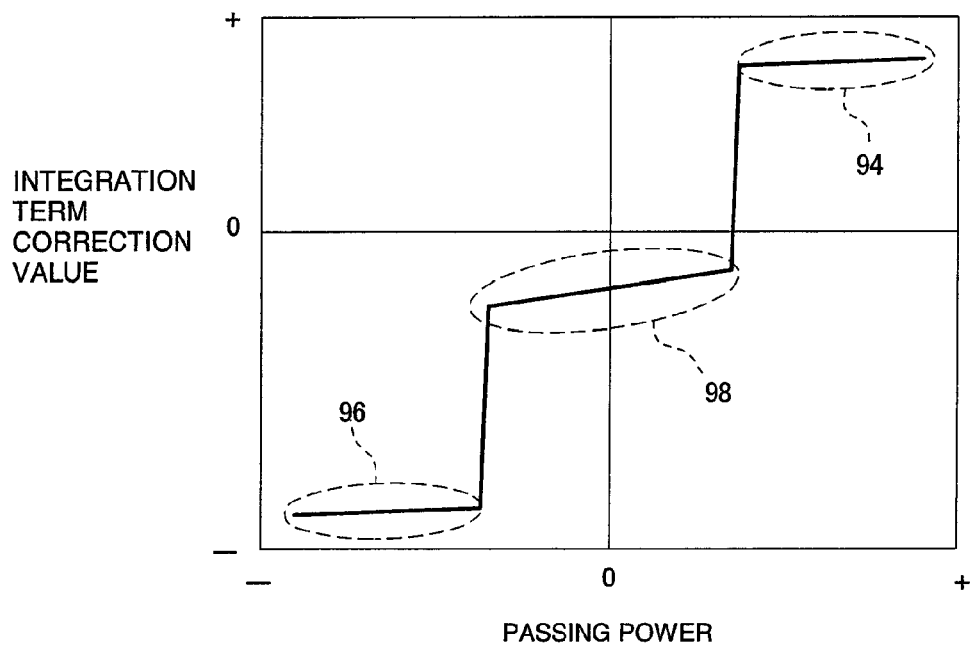
FIG. 7 is a view illustrating three states of the correction function of the integration term according to the embodiment of the present invention.

A simpler method can be used to store the correction functions for integration term. That is, as shown in FIG. 7, the correction function for integration term generally exhibits three states. Namely, the state of the converting passing power is distinguished into a positive state 94 in which power passes from the first power source side to the second power source side, a negative state 96 in which power passes from the second power source side to the first power source side, and a zero cross state 98 that is intermediate between the positive state 94 and the negative state 96. Then, for each of the states, the correction value for integration term varies with an almost constant relationship to the passing power. Alternatively, a constant correction value for integration term can be approximated for each state. Thus, storage of the correction value for integration term in each state enables a reduction in required storage capacity compared to storage of the integration term correction functions in function form.

Distinctions between the positive state 94 and the negative state 96 and the zero cross state 98 can be specified based on comparison between predefined thresholds and both the maximum and minimum values of the converter passing current by a control cycle of the duty ratio.

Figure 8:
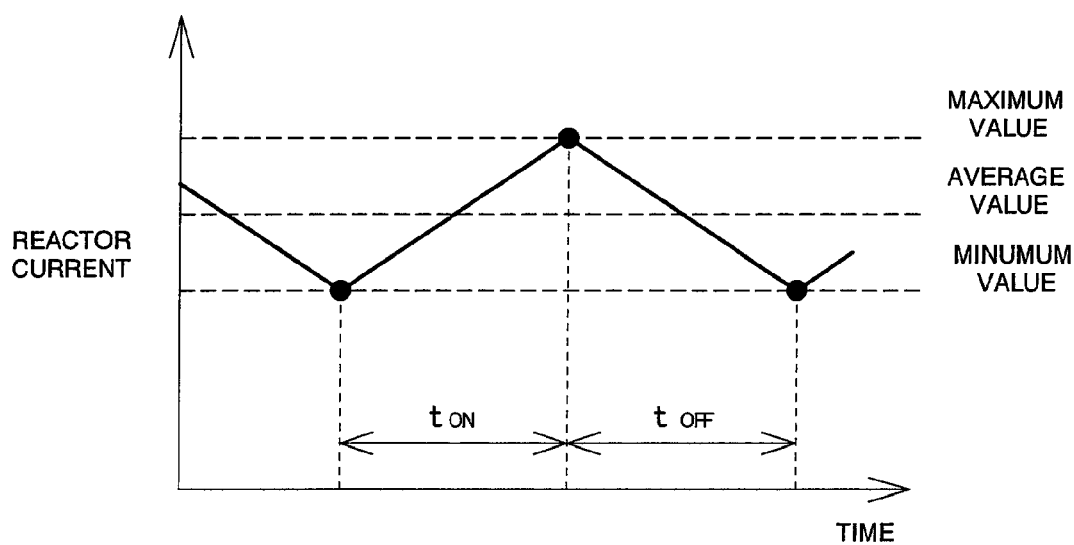
FIG. 8 is a view illustrating a temporal variation in reactor current according to the embodiment of the present invention.

The current flowing through the reactors can be detected by attaching a current detecting sensor to the reactors. FIG. 8 shows how the current flows through the reactors during duty ratio control. In FIG. 8, the axis of abscissa indicates time. The axis of ordinate indicates the current flowing through the reactors. As shown in FIG. 8, the magnitude of a current passing through the reactors increases during the on time of the switching element making up the converter device 30 and decreases during the off time thereof. Consequently, the waveform of the converter passing current varies between the maximum value and the minimum value depending on the control cycle of the duty ratio.

Figure 9:
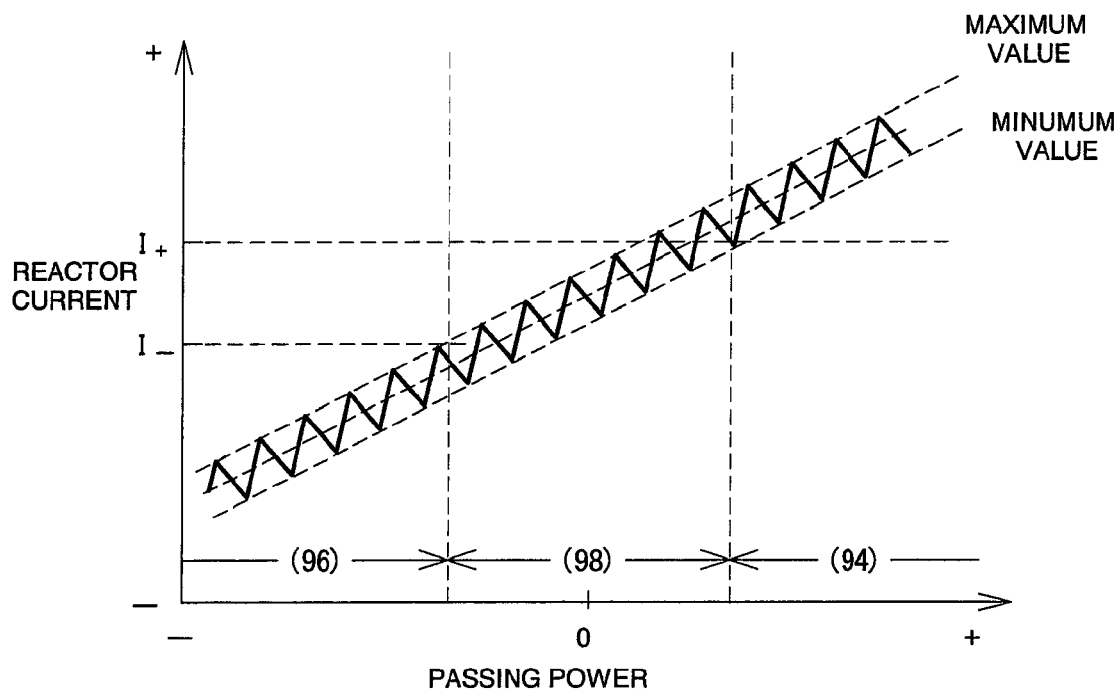
FIG. 9 is a view illustrating a method of distinguishing the three states of the correction function of the integration term from one another according to the embodiment of the present invention.

Here, when the passing power is varied in the converter device 30, the reactor current waveform generally varies as shown in FIG. 9. In FIG. 9, the axis of abscissa indicates the converter passing power. The axis of ordinate indicates a current passing through the converter device 30, for example, the current passing through the reactors. When the passing power in the converter device 30 is varied, the reactor current waveform varies such that with the average current increasing consistently with the passing power, the current repeatedly increases and decreases between the maximum and minimum values of the waveform depending on the control cycle of the duty ratio as shown in FIG. 8. In view of the three states of the correction function for the integration term in FIG. 7, two thresholds $I_-$ and $I_+$ are set such that the three states are distinguished from one another based on comparison between the thresholds and the maximum and minimum values for the converter passing current waveform varying depending on the control cycle of the duty ratio. That is, the negative state 96 can be defined as a state where a peak of the reactor current is smaller than the threshold $I_-$. The positive state 94 can be defined as a state where a trough of the reactor current is greater than the threshold $I_+$. The zero cross state 98 can be defined as a state where neither of the above-described conditions is true, that is, defined to lie between the negative state 96 and the positive state 94 with a transition width taken into account.

Thus, the correction value for the integration term is stored for each of the states of the converter passing power distinguished from one another based on the comparison between predefined thresholds and the peak values of the converter passing power varying depending on the control cycle of the duty ratio. As a result, the correction values for the integration term can be stored so as to be clearly distinguished from one another.

INDUSTRIAL APPLICABILITY

The present invention is utilized for a converter control device. In particular, the present invention is utilized for a converter control device including an arrangement in which a plurality of converters are connected together in parallel, the converters being connected between a first power source and a second power source and each having a plurality of switching elements and a reactor to convert a voltage in both directions, the converter control device changing the number of converter phases to be driven according to converter passing power.

What is claimed is:

1. A converter control device, including an arrangement in which a plurality of converters are connected together in parallel, the converters being connected between a first power source and a second power source and each having a plurality of switching elements and a reactor to convert a voltage in both directions between the first and second power sources, and changes the number of converter phases to be driven according to converter passing power, the converter control device comprising:
   a control unit feeding back a measured value of duty ratio of an actual operation with respect to an instruction value of the duty ratio provided to the plurality of switching elements for the voltage conversion, to inhibit a deviation between the measured value of the duty ratio and the instruction value of the duty ratio by PID control;
   a storage section which, in order to correct the integration term in the PID control, predetermines and stores a correction function for the integration term in each drive phase quantity, the correction function corresponding to a relationship between converter passing power and a correction value for the integration term; and
   a correction function switching section which, when number of drive phases is changed according to the converter passing power, switching to the correction function for the integration term corresponding to the changed number of drive phases of the converters,
   wherein the first and second power sources are different from one another.

2. The converter control device according to claim 1, wherein the storage section stores the integral correction value for each of the states into which the state of the converter passing power is distinguished and which include a positive state that the power passes from a first power source side to a second power source side, a negative state that the power passes from the second power source side to the first power source side, and a zero cross state that is intermediate between the positive state and the negative state.

3. The converter control device according to claim 2, wherein the storage section stores the integral correction value for each of the states of the converter passing power distinguished from one another based on comparison between predefined thresholds and both a maximum value and a minimum value for a converter passing current waveform varying depending on a control cycle of the duty ratio.

4. The converter control device according to claim 1, wherein the first power source is a secondary battery.

5. The converter control device according to claim 1, wherein the second power source is a fuel cell.

6. The converter control device according to claim 1, wherein the plurality of converters comprise a primary side switching circuit on a first power source side and a secondary side switching circuit on a second power source side.

7. The converter control device according to claim 6, wherein the reactor is provided between the primary side switching circuit and the secondary side switching circuit, and the first and second power sources are connected to opposite sides of the reactor.

8. A vehicle including a converter control device, the converter control device including an arrangement in which a plurality of converters are connected together in parallel, the converters being connected between a first power source and a second power source and each having a plurality of switching elements and a reactor to convert a voltage in both directions, and changes the number of converter phases to be driven according to converter passing power, the converter control device comprising:
   a control unit feeding back a measured value of duty ratio of an actual operation with respect to an instruction value of the duty ratio provided to the plurality of switching elements for the voltage conversion, to inhibit a deviation between the measured value of the duty ratio and the instruction value of the duty ratio by PID control;
   a storage section which, in order to correct the integration term in the PID control, predetermines and stores a correction function for the integration term in each drive phase quantity, the correction function corresponding to a relationship between converter passing power and a correction value for the integration term; and
   a correction function switching section which, when number of drive phases is changed according to the converter passing power, switching to the correction function for the integration term corresponding to the changed number of drive phases of the converters, wherein the first and second power sources are DC voltage sources, and wherein the first and second power sources are different from one another.

* * * * *